(12) United States Patent
Davidson et al.

(10) Patent No.: US 8,024,237 B1
(45) Date of Patent: Sep. 20, 2011

(54) METHOD AND APPARATUS FOR AUTOMATED BILL OF MATERIALS REFACTORING

(75) Inventors: Harold R. Davidson, American Fork, UT (US); Kirk Arthur Lee, Cedar Hills, UT (US); Michael Amore Scalora, Orem, UT (US); Burton Thomas Perkins, Alpine, UT (US)

(73) Assignee: Intuit Inc., Mountain View, CA (US)

( * ) Notice: Subject to any disclaimer, the term of this patent is extended or adjusted under 35 U.S.C. 154(b) by 730 days.

(21) Appl. No.: 11/493,209

(22) Filed: Jul. 25, 2006

(51) Int. Cl.
*A06K 5/02* (2006.01)
(52) U.S. Cl. ............................................. 705/29
(58) Field of Classification Search ..................... 705/29
See application file for complete search history.

(56) References Cited

U.S. PATENT DOCUMENTS

| | | | | |
|---|---|---|---|---|
| 5,307,261 A | * | 4/1994 | Maki et al. | 705/29 |
| 6,085,493 A | * | 7/2000 | DeBusk et al. | 53/445 |
| 6,650,954 B2 | * | 11/2003 | Zulpa et al. | 700/107 |
| 6,807,548 B1 | * | 10/2004 | Kemper | 707/103 R |
| 6,957,186 B1 | * | 10/2005 | Guheen et al. | 705/1 |
| 7,103,434 B2 | * | 9/2006 | Chernyak et al. | 700/98 |
| 7,370,318 B1 | * | 5/2008 | Howe et al. | 717/110 |
| 2003/0150909 A1 | * | 8/2003 | Markham et al. | 235/376 |
| 2003/0154144 A1 | * | 8/2003 | Pokorny et al. | 705/28 |
| 2003/0188291 A1 | * | 10/2003 | Fisher | 717/102 |
| 2004/0040017 A1 | * | 2/2004 | Kershenbaum et al. | 717/158 |
| 2004/0098151 A1 | * | 5/2004 | Carlucci et al. | 700/95 |
| 2005/0278670 A1 | * | 12/2005 | Brooks et al. | 716/5 |
| 2006/0052895 A1 | * | 3/2006 | Woehler | 700/107 |
| 2006/0282350 A1 | * | 12/2006 | Lind et al. | 705/29 |

OTHER PUBLICATIONS

"Empirical investigation of refactoring effect on software quality" Alshayeb, Mohammad Information & Software Technology Sep. 2009 vol. 51, pp. 1319.*

* cited by examiner

*Primary Examiner* — Matthew S Gart
*Assistant Examiner* — Oluseye Iwarere
(74) *Attorney, Agent, or Firm* — Gunnison, McKay & Hodgson, L.L.P.; Philip McKay

(57) ABSTRACT

A method and apparatus for automated bill of materials refactoring includes a computing system implemented process for automated bill of materials refactoring whereby historical bill of materials, inventory and sales data is scanned/searched to identify potential refactored sub-assemblies.

30 Claims, 6 Drawing Sheets

200B

230

231

240

THE FOLLOWING BASIC PARTS/SUB-ASSEMBLIES
OCCUR TOGETHER THREE TIMES IN THREE
DIFFERENT LARGER ASSEMBLIES/PRODUCTS: 241

A. Microprocessor (1);
B. Power Supply Module(1);
C. Capacitors, 10 microfarad (5);   242
D. Capacitors, 5 microfarad (6);
E. Resistors 10 ohm (6);
F. Resistors 3 ohm (20).

THESE BASIC PARTS/SUB-ASSEMBLIES
OCCUR TOGETHER IN THE
FOLLOWING LARGER SYSTEMS:

1. DESKTOP SYSTEM;               244
2. NOTEBOOK SYSTEM;
3. SERVER SYSTEM

WOULD YOU LIKE TO CREATE A REFACTORED
SUB-ASSEMBLY INCLUDING THESE
BASIC PARTS/SUB-ASSEMBLIES?      246

| X | YES | | NO | | EDIT |
| | 247 | | 248 | | 246 |

THE FOLLOWING BASIC PARTS/SUB-ASSEMBLIES
HAVE BEEN COLLECTIVELY DESIGNATED
"MOTHERBOARD ONE"

Microprocessor (1);
Power Supply Module(1);
Capacitors, 10 microfarad (5);
Capacitors, 5 microfarad (6);
Resistors 10 ohm (6);
Resistors 3 ohm (20).          262

MOTHERBOARD ONE IS USED IN THE
FOLLOWING LARGER SYSTEMS:

1. DESKTOP SYSTEM;
2. NOTEBOOK SYSTEM;
3. SERVER SYSTEM

CONFIRMED ☐   263

FIG.2D

METHOD AND APPARATUS FOR AUTOMATED BILL OF MATERIALS REFACTORING

BACKGROUND

Many businesses manufacture, assemble and provide final products that are themselves made up of sub-assemblies and/or individual basic parts. In addition, in many instances, multiple final products provided by a business include common basic parts and/or sub-assemblies. Currently, the primary mechanism for organizing and tracking basic parts and sub-assemblies of a finished product is a bill of materials, or bill of material, (BOM).

A bill of materials is an essential part of the design, manufacture, inventory, and sale of any final product or high level product assembly that consists of more than one basic part. A bill of materials is used to describe a product in terms of its assemblies, sub-assemblies, and basic parts. At its most fundamental, and simplistic, level a bill of materials consists of a list of all the basic parts required to create or provide a given final product and/or high level product assembly. However, bills of materials are most useful for identifying sub-assemblies, and providing hierarchical sub-assembly listings in the form of multiple hierarchical bills of materials, with the master, or highest level, bill of materials describing a list of the largest, or most complicated, components, and sub-assemblies and then the various sub-assemblies and/or basic parts of these highest order components and sub-assemblies being described as a further list of components and sub-assemblies in lower level bills of materials, and so on, all the way down to single individual basic parts being listed in a lowest level of bill of materials. Using a bill of materials, multi-part sub-assemblies can be identified at a desired hierarchical level without the need to necessarily list, or enter, all the constituent sub-assemblies and/or basic parts making up the multi-part sub-assembly, thereby saving time and energy, increasing overall efficiency, and minimizing the opportunities to introduce error.

In addition, using a bill of materials, the actual need for a larger number of particular sub-assemblies, for multiple finished products, is identified than might be identified without the bill of materials. As a result, based on the information gained by using the bill of materials, larger batches of manufacturing sub-assemblies are produced and starting and stopping of the manufacturing processes occurs less frequently. Less frequent starting and stopping of the manufacturing processes typically means more efficiency and less overhead cost. Therefore, using a bill of materials, manufacturing costs can often be reduced and profits increased and/or sale prices of the finished product reduced. In addition, the true need for sub-assemblies identified using a bill of materials can also be out-sourced to lower cost manufacturers.

In addition, using a bill of materials, shared sub-assemblies are identified and this can reduce the amount of inventory needed and/or the amount of warehouse space needed to carry sufficient inventory to meet demand fluctuations. As a result, inventory can be run more efficiently and inventory costs can be reduced using a bill of materials.

In addition, using a bill of materials, the time to manufacture a finished product, from order to delivery, can be reduced by having the correct sub-assemblies and the correct number of sub-assemblies, as identified using a bill of materials, on hand and assembled to reduce final finished goods assembly time.

In addition, once a well defined and complete bill of materials is created for one level of sub-assemblies, creating higher level, or new, bills of materials, such as a master bill of materials, is greatly simplified.

As an example, for a computing system, such as a desktop PC, the highest level bill of materials might list the shipping box, manual, packaging, packaging labels and the actual PC. Then the PC itself referenced in this highest level bill of materials might contain its own list of sub-assemblies like power supply, motherboard, hard drive, case, etc. This increasing level of detail then continues for all sub-assemblies until it reaches its constituent parts, such as resistors or processors, or modules that are out of the scope of the bill of materials, such as parts making up a fan that is bought as a module from another manufacturer.

As discussed above, bills of materials are extremely important, since without a working knowledge of how many basic parts a product needs, there is no way of knowing how many units of that part a business needs to buy and keep in inventory and/or warehouse. As also discussed above, a bill of materials is most useful when sub-assemblies are recognized and the bill of materials is efficiently organized or "refactored" using the recognized sub-assemblies. However, as many of the products sold and used in the world today have become larger and larger collections of basic parts and sub-assemblies, and as many individual businesses continue to produce and offer a greater selection of products, it has become harder and harder for businesses to recognize common sub-assemblies and to refactor the bills of materials to include these sub-assemblies.

For instance, continuing with the PC example from above, a desktop system, a notebook system, and a server system assembled and/or manufactured by the computing system manufacturer business can easily share several common sub-assemblies such as memory sub-assemblies, hard drive sub-assemblies, power supply sub-assemblies, motherboard sub-assemblies, graphics board sub-assemblies, software packages/sub-assemblies, etc. In addition, each of these sub-assemblies can, and often does, include further basic parts and/or sub-assemblies such as memory chips/chip modules, microprocessors/modules, discrete components such as capacitors, resistors, inductors, etc.

As a further specific example, assume the desktop system, the notebook system and the server system all use the same motherboard, and that the common motherboard includes a given microprocessor, a power supply module, and various discrete components. It is quite possible that a bill of materials clerk might enter each the basic parts into a computing system implemented inventory and sales tracking system as part of a rather inefficient bill of materials listing:

Desktop PC:
Microprocessor (1);
Power Supply Module (1);
Capacitors, 10 microfarad (5);
Capacitors, 5 microfarad (6);
Resistors 10 ohm (6);
Resistors 3 ohm (20); etc.

Then the same bill of materials clerk might enter a similar list for a notebook system as follows:

Notebook System:
Microprocessor (1);
Power Supply Module (1);
Capacitors, 10 microfarad (5);
Capacitors, 5 microfarad (6);
Resistors 10 ohm (6);
Resistors 3 ohm (20); etc.

Then the same bill of materials clerk might enter a similar list for a server system as follows:

Server System:

Microprocessor (1);
Power Supply Module (1);
Capacitors, 10 microfarad (5);
Capacitors, 5 microfarad (6);
Resistors 10 ohm (6);
Resistors 3 ohm (20); etc.

This type of redundant entry often occurs day in and day out without anyone ever recognizing that the basic parts: Microprocessor (1); Power Supply Module (1); Capacitors, 10 microfarad (5); Capacitors, 5 microfarad (6); Resistors, 10 ohm (6); and Resistors, 3 ohm (20), could all be refactored and entered under the single sub-assembly "motherboard".

Of course, the example above is a highly simplified illustrative example. Many products and/or sub-assemblies, including real motherboards and computing systems, are far more complicated and therefore recognizing a given sub-assembly and refactoring an actual bill of materials is far more difficult. Consequently, considerable time and energy is currently often expended repeatedly entering basic parts or sub-assemblies that could be refactored into larger groupings, and numerous opportunities for errors are introduced.

SUMMARY

In accordance with one embodiment, a method and apparatus for automated bill of materials refactoring includes a computing system implemented process for automated bill of materials refactoring whereby historical bill of materials, inventory and sales data is scanned/searched to identify potential refactored sub-assemblies.

One embodiment of a process for automated bill of materials refactoring makes use of the fact that most businesses currently use computing system implemented financial management systems and/or computing system implemented inventory and sales tracking systems to: manage and track inventory; process and use bills of materials; track sales and purchases; manage expenses; and generate various documents associated with business and inventory operations such as bills of materials, purchases orders, item lists, available inventory reports, receipts, and various other transaction forms and documents.

In one embodiment, the historical bills of materials, inventory, sales and sub-assembly data gathered and/or tracked and/or stored by the computing system implemented financial management system and/or computing system implemented inventory and sales tracking system is then scanned/searched to identify potential refactored sub-assemblies using user, community and/or provider defined parameters.

In one embodiment, once potential refactored sub-assemblies are identified, a potential refactored sub-assemblies report is generated and displayed for the user listing all proposed/potential refactored sub-assemblies. In one embodiment, the user is then provided with an opportunity to edit and/or confirm any, or all, of the potential refactored sub-assemblies. In one embodiment, once the user confirms the potential refactored sub-assemblies, the newly refactored sub-assemblies are implemented in a refactored bill of materials.

In one embodiment, the process for automated bill of materials refactoring disclosed herein is more automated and once potential refactored sub-assemblies are identified, and a potential refactored sub-assemblies report is generated and displayed for the user, the newly refactored sub-assemblies are automatically implemented in a refactored bill of materials without further user editing or confirmation.

Using the method and apparatus for automated bill of materials refactoring, and a process for automated bill of materials refactoring, disclosed herein, automated computer processing is used in conjunction with often pre-existing databases to identify potential refactoring of basic parts into sub-assemblies that would often escape human detection. In addition, the refactoring is accomplished at computing system speeds far exceeding human capabilities. Consequently, using the method and apparatus for automated bill of materials refactoring, and a process for automated bill of materials refactoring, disclosed herein, more efficient and useful bills of material can be created, more accurately and faster, and significant redundancy of user input and/or automated processing can be avoided as well as opportunities for error introduction.

In addition, as discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

FIG. 2B is a representation of one embodiment of a display screen layout in accordance with one embodiment of a process for automated bill of materials refactoring;

FIG. 2D is a representation of one embodiment of a display screen layout in accordance with one embodiment of a process for automated bill of materials refactoring.

Figure 1:
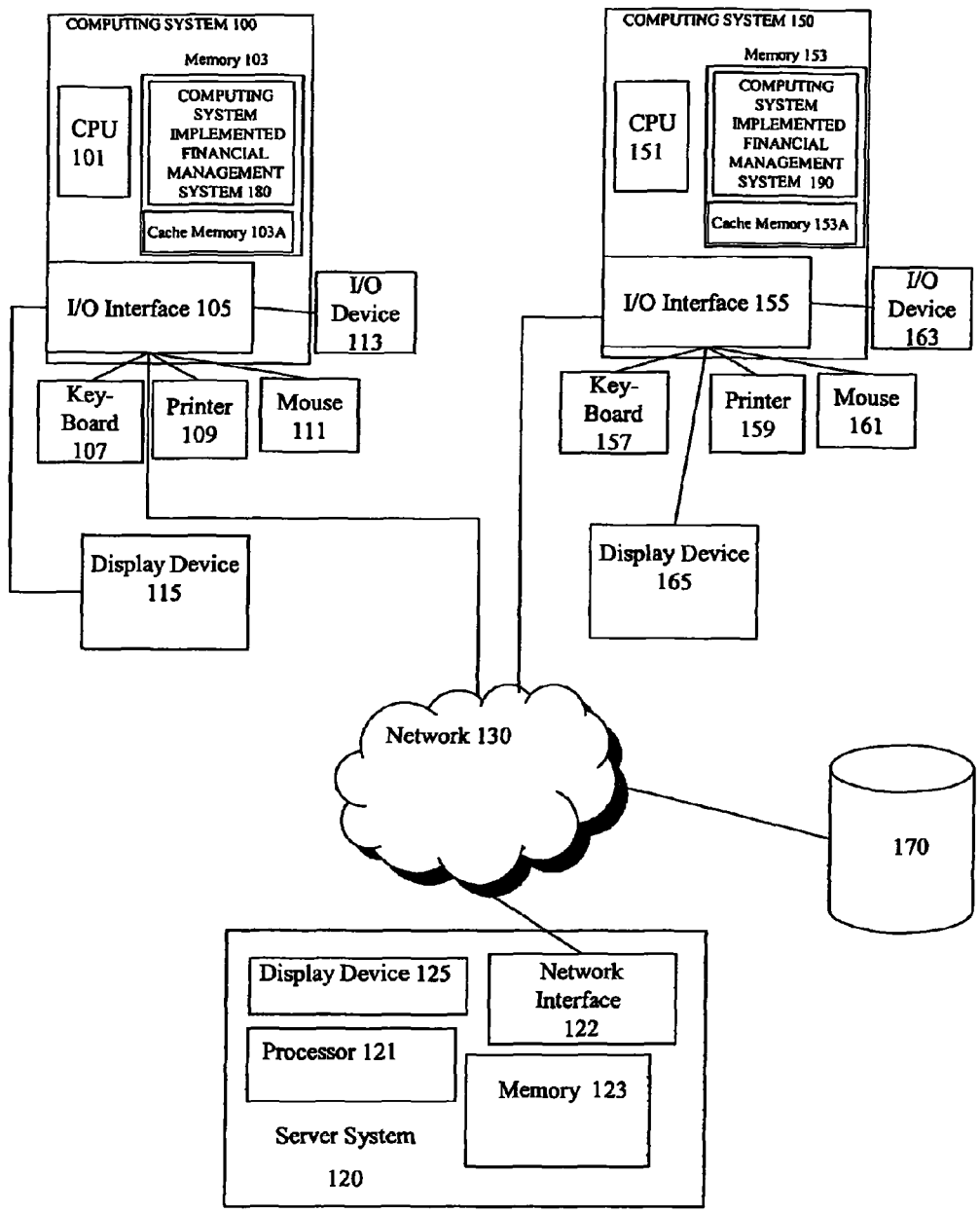
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In addition, the particular display screen layouts, appearance, and terminology as depicted and described herein, are intended to be illustrative and exemplary only, and in no way limit the scope as claimed.

Figure 2A:
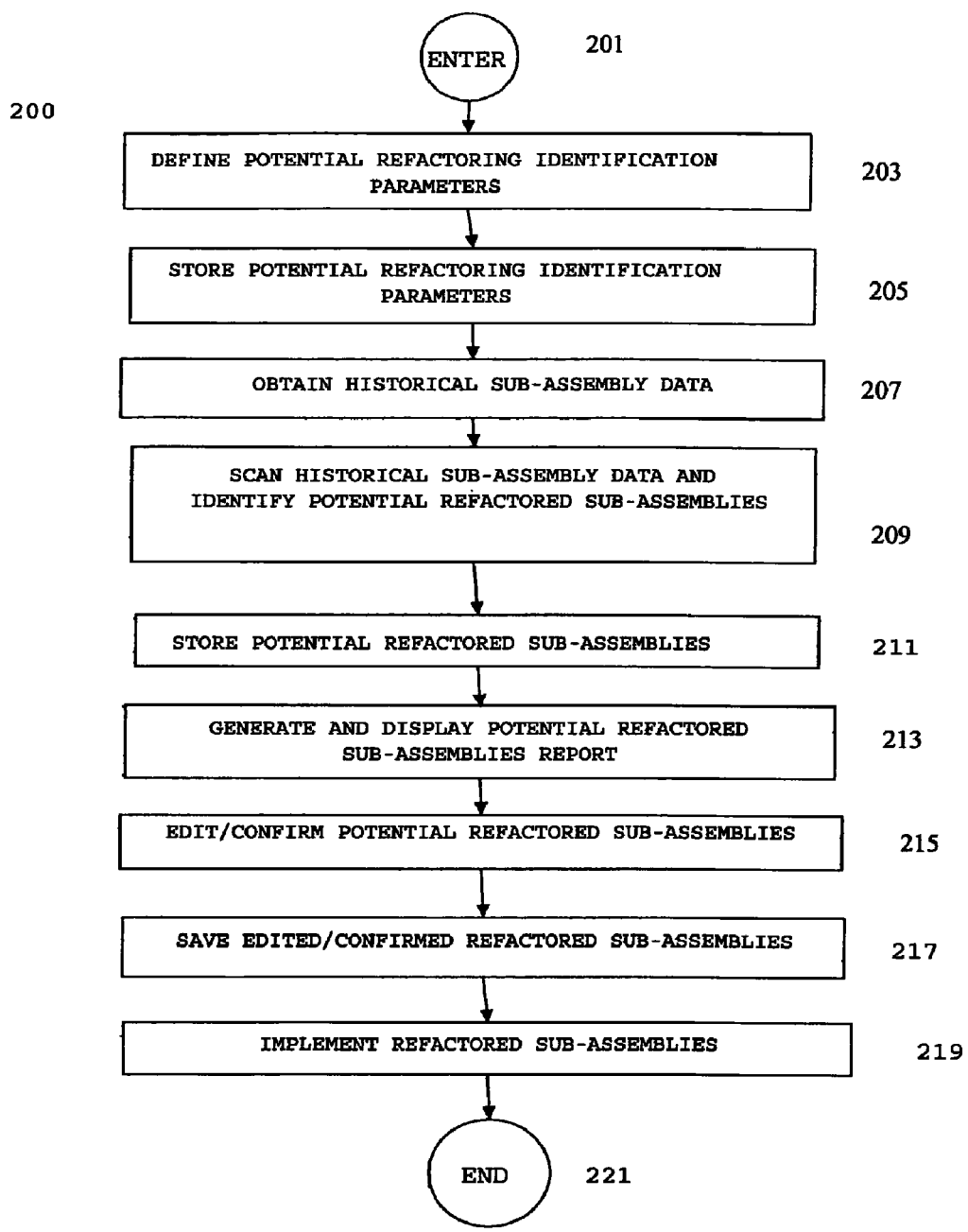
FIG. 2A is a flow chart depicting a process for automated bill of materials refactoring in accordance with one embodiment.
Figure 3:
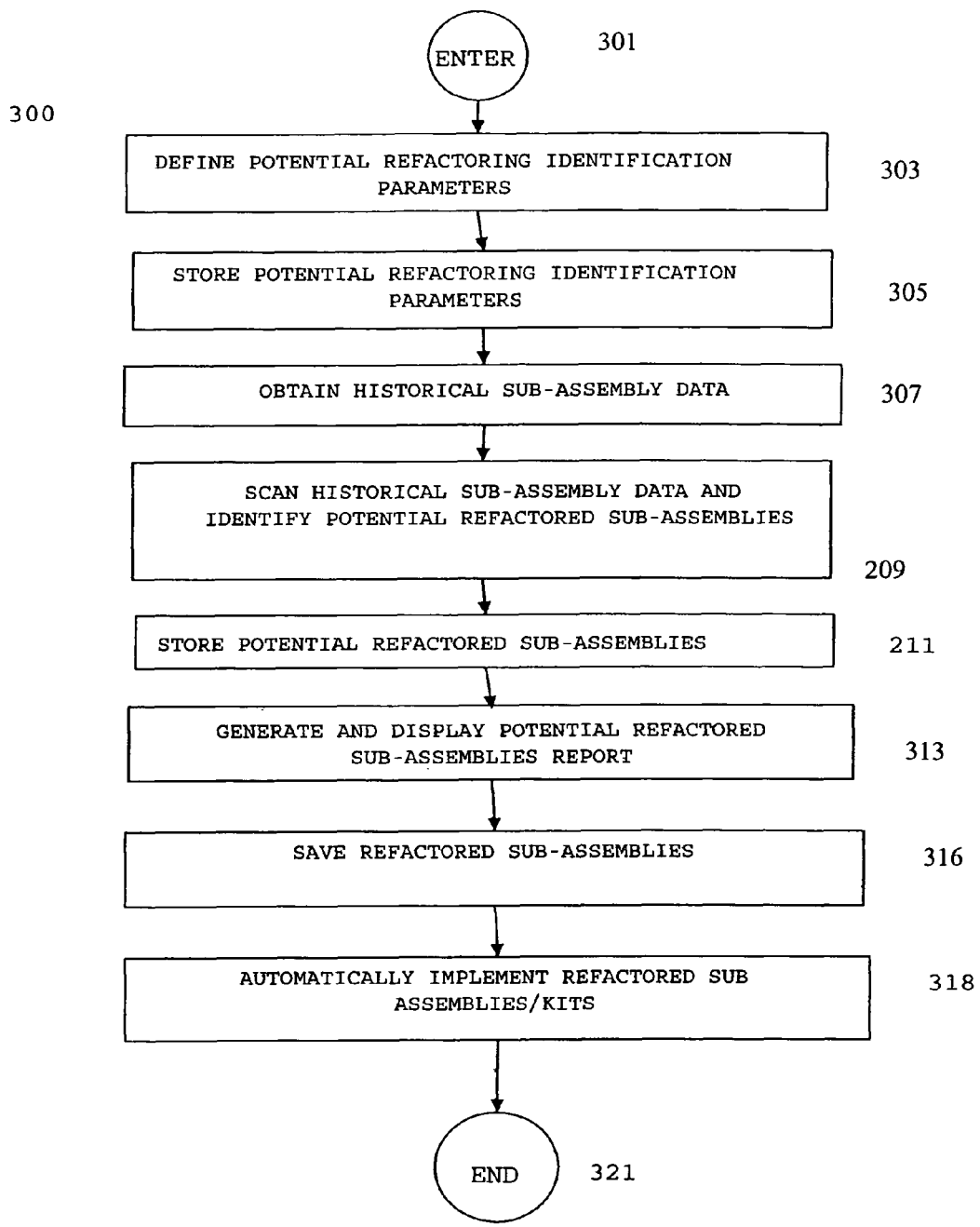
FIG. 3 is a flow chart depicting a process for automated bill of materials refactoring in accordance with one embodiment.

In accordance with one embodiment, a method and apparatus for automated bill of materials refactoring includes a computing system implemented process for automated bill of materials refactoring (200 in FIG. 2A and 300 In FIG. 3)

whereby historical bill of materials, inventory and sales data is scanned/searched to identify potential refactored sub-assemblies.

One embodiment of a process for automated bill of materials refactoring makes use of the fact that most business and service providers currently use computing system implemented financial management systems and/or computing system implemented inventory and sales tracking systems to: manage and track inventory; process and use bills of materials; track sales and purchases; manage expenses; and generate various documents associated with business and inventory operations such as bills of materials, purchases orders, item lists, available inventory reports, receipts, and various other transaction forms and documents.

In one embodiment, the historical bills of materials, inventory, sales and sub-assembly data gathered and/or tracked and/or stored by the computing system implemented financial management system and/or computing system implemented inventory and sales tracking system is then scanned/searched to identify potential refactored sub-assemblies using user, community and/or provider defined parameters.

In one embodiment, once potential refactored sub-assemblies are identified, a potential refactored sub-assemblies report (240 in FIG. 2B) is generated and displayed for the user listing the proposed/potential refactored sub-assemblies. In one embodiment of a process for automated bill of materials refactoring (200 in FIG. 2A), the user is then provided with an opportunity to edit and/or confirm any, or all, of the potential refactored sub-assemblies. In one embodiment, once the user confirms the potential refactored sub-assemblies, the new refactored sub-assemblies are implemented in a refactored bill of materials.

In one embodiment of a process for automated bill of materials refactoring (300 in FIG. 3), the process for automated bill of materials refactoring is more automated and once potential refactored sub-assemblies are identified, and a potential refactored sub-assemblies report is generated and displayed for the user, the new refactored sub-assemblies are automatically implemented in a refactored bill of materials without further user editing or confirmation.

Using the method and apparatus for automated bill of materials refactoring, and a process for automated bill of materials refactoring, disclosed herein, automated computer processing is used in conjunction with often pre-existing databases to identify potential refactoring of basic parts into sub-assemblies that would often escape human detection. In addition, the refactoring is accomplished at computing system speeds far exceeding human capabilities. Consequently, using the method and apparatus for automated bill of materials refactoring, and a process for automated bill of materials refactoring, disclosed herein, more efficient and useful bills of material can be created, more accurately and faster, and significant redundancy of user input and/or automated processing can be avoided, as well as opportunities for error introduction.

As used herein, the term computing system implemented financial management system includes, but is not limited to: computing system implemented business systems, packages, programs, modules, or applications; computing system implemented inventory and sales tracking systems, packages, programs, modules, or applications; computing system implemented personal and small business financial management systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, whether available or known at the time of filing or as developed later.

For illustrative purposes, embodiments are described within the framework of, and using, one or more computing system implemented inventory and sales tracking systems and/or computing system implemented business financial management systems and/or computing system implemented business accounting management systems. Various specific details are discussed below, and shown in the accompanying FIG.s, to aid one of skill in the art in understanding the invention. However, such specific details are intended to be illustrative only, and are not intended to restrict in any way the scope as claimed herein. In addition, the particular terminology used herein is intended to be illustrative and exemplary only, and in no way limits the scope as claimed.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether available or known at the time of filing or as developed later. Some embodiments are implemented in a mobile computing system running mobile operating systems such as Symbian° OS, Windows® Mobile, or any other operating system designed to generally manage operations on a mobile computing system, whether available or known at the time of filing or as developed later. As described more fully below, embodiments can be implemented on computing systems other than a conventional computing system such as, for example, a personal digital assistant, a cell phone, or other computing system capable of processing computer readable data, whether available at the time of filing or as developed later. Computing systems also include those in which one or more computing resources (hardware or software) are located remotely and accessed via network, such as a Local Area Network (LAN), Wide Area Network (WAN), a public network, such as the Internet, a private network, or other electronic medium in which data may be exchanged between one computing system and one or more other computing system(s), whether available at the time of filing or as developed later. Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, the computing system implemented financial management systems described herein make use of input provided to the computing system implementing the process for automated bill of materials refactoring, discussed herein, via user interface devices such as a keyboard, mouse, touchpad, or any other device capable of providing user input to a computing system or for translating user actions into computing system operations, whether available or known at the time of filing or as developed later.

Hardware System Architecture

FIG. 1 is a block diagram of an exemplary hardware architecture for implementing one embodiment of a method and apparatus for automated bill of materials refactoring, discussed herein, that includes: a computing system 100, e.g., a first computing system; a computing system 150, e.g., a second computing system; a server system 120; and a database 170, all operatively connected by a network 130.

As seen in FIG. 1, computing system 100 typically includes a central processing unit (CPU) 101, hereinafter processor 101, an input/output (I/O) interface 105, and a memory system 103, including cache memory 103A. In one embodiment, memory system 103 includes one or more computing system implemented financial management systems 180 stored, in whole, or in part, therein, that are used by, or include, as discussed below, a process for automated bill of materials refactoring, such as processes 200 and 300 discussed below.

Computing system 100 may further include standard user interface devices such as a keyboard 107, a mouse 111, a printer 109, and a display device 115, as well as, one or more standard input/output (I/O) devices 113, such as a compact disk (CD) or DVD drive, floppy disk drive, or other digital or waveform port, or other device capable of inputting data to, and outputting data from, computing system 100, whether available or known at the time of filing or as later developed. As discussed in more detail below, in one embodiment, a process for automated bill of materials refactoring, such as processes 200 and 300, and a computing system implemented financial management system 180, can be loaded, in whole, or in part, into computing system 100 via I/O device 113, such as from a CD, DVD or floppy disk containing all, or part, of computing system implemented financial management system 180.

Similarly, computing system 150 typically includes a central processing unit (CPU) 151, hereinafter processor 151, an input/output (I/O) interface 155, and a memory system 153, including cache memory 153A. In one embodiment, memory system 153 includes one or more computing system implemented financial management systems 190 stored, in whole, or in part, therein, that are used by, or include, as discussed below, a process for automated bill of materials refactoring, such as processes 200 and 300.

Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed. As discussed in more detail below, in one embodiment, a process for automated bill of materials refactoring, such as processes 200 and 300, and a computing system implemented financial management system 190, can be loaded, in whole, or in part, into computing system 150 via I/O device 163, such as from a CD, DVD or floppy disk containing all, or part, of computing system implemented financial management system 190.

Also shown in FIG. 1 is database 170. In one embodiment, database 170 is a designated server system or computing system, or a designated portion of a server system or computing system, such as computing systems 100, 150 and 120. In one embodiment, database 170 is a dedicated mass storage device implemented in software, hardware, or a combination of hardware and software. In one embodiment, database 170 is a web-based function. As discussed in more detail below, in one embodiment, a process for automated bill of materials refactoring, such as processes 200 and 300, and/or computing system implemented financial management system 180 and/ or computing system implemented financial management system 190 are stored in whole, or in part, in database 170.

In one embodiment, computing systems 100 and 150, and database 170, are coupled to a server system 120 by network 130. Server system 120 typically includes a server system display device 125, a server system processor 121, a server system memory 123, and a server system network interface 122. As discussed in more detail below, in one embodiment, a process for automated bill of materials refactoring, such as processes 200 and 300, and a computing system implemented financial management system 180 and/or computing system implemented financial management system 190 are stored in whole, or in part, in server system 120.

Network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed. In various embodiments, server system network interface 122 and I/O interfaces 105 and 155 include analog modems, digital modems, a network interface card, a broadband connection, or any other means for communicably coupling computing systems 100 and 150, database 170, and server system 120, via network 130, whether available or known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network, as discussed herein. In addition, the particular type of, and configuration of, computing systems 100 and 150, database 170, and server system 120 are not relevant.

As discussed in more detail below, in one embodiment, a process for automated bill of materials refactoring, such as processes 200 and 300, and a computing system implemented financial management system 180 and/or computing system implemented financial management system 190 are stored in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for automated bill of materials refactoring, such as processes for automated bill of materials refactoring 200 and 300, and a computing system implemented financial management system, are sometimes referred to herein, alternatively, as a process, an application, a module, a program, a component of a software system, a component of a software package, a component of a parent system, or a feature of a parent system, this terminology is illustrative only. In some embodiments, a process for automated bill of materials refactoring, such as processes 200 and 300, and a computing system implemented financial management system, discussed herein, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as processors 101 and 151, or server system processor 121. In one embodiment, execution of a process for automated bill of materials refactoring, such as processes 200 and 300, and a computing system implemented financial management system, discussed herein, by processor 101, processor 151, or server system processor 121, results in the operations of an agent computer process (not shown) and/or a rule computer process (not shown).

In one embodiment, a process for automated bill of materials refactoring, such as processes 200 and 300, and a computing system implemented financial management system, discussed herein, are a computer application or process implemented and/or run and/or stored, in full, or in part, in, or on, a computer program product. Herein, a computer program product comprises a medium configured to store or transport computer readable code, whether available or known at the time of filing or as later developed. Some examples of computer program products are CD-ROM discs, DVDs, ROM cards, floppy discs, magnetic tapes, computer hard drives, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, the medium also may be removed from the computing system.

For example, all, or part, of a process for automated bill of materials refactoring, such as processes 200 and 300, and a computing system implemented financial management system, discussed herein, may be stored in a memory that is physically located in a location, such as server system memory 123, or database 170, of FIG. 1, different from a computing system, such as computing systems 100 and/or 150 of FIG. 1, utilizing a process for automated bill of materials refactoring, such as processes 200 and 300, and a computing system implemented financial management system. In one embodiment, all, or part, of a process for automated bill of materials refactoring, such as processes 200 and 300, and a computing system implemented financial management system, discussed herein, may be stored in a memory that is physically located, separate from the computing system's processor(s), such as processors 101 and 151 of FIG. 1, and the computing system processor(s) can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server system, such as computing systems 100 and/or 150 and/or server system 120 of FIG. 1, running and/or utilizing and/or storing all, or part, of a process for automated bill of materials refactoring, such as processes 200 and 300, and a computing system implemented financial management system, discussed herein, is a portable computer, a workstation, a two-way pager, a cellular telephone, a smart phone, a digital wireless telephone, a personal digital assistant, a server computer, an Internet appliance, or any other device that includes components that can execute all, or part, of a process for automated bill of materials refactoring, such as processes 200 and 300, and a computing system implemented financial management system, discussed herein, in accordance with at least one of the embodiments as described herein. Similarly, in another embodiment, a process for automated bill of materials refactoring, such as processes 200 and 300, and a computing system implemented financial management system, discussed herein, are implemented on and/or run and/or stored on a computing system and/or server system that is comprised of multiple different computers, wireless devices, cellular telephones, digital telephones, two-way pagers, personal digital assistants, server computers, or any desired combination of these devices, that are interconnected to perform the processes as described herein.

Process

In one embodiment, a process for automated bill of materials refactoring obtains historical bill of materials and other related data and then scans/searches the data to identify potential refactored sub-assemblies. In one embodiment, a potential refactored sub-assemblies report is then generated and displayed that is user editable and requires user confirmation.

FIG. 2A is a flow chart depicting a process for automated bill of materials refactoring 200 in accordance with one embodiment. Process for automated bill of materials refactoring 200 begins at ENTER OPERATION 201 and process flow proceeds to DEFINE POTENTIAL REFACTORING IDENTIFICATION PARAMETERS OPERATION 203.

At DEFINE POTENTIAL REFACTORING IDENTIFICATION PARAMETERS OPERATION 203 various parameters are established and/or defined that will be used by process for automated bill of materials refactoring 200 to identify potential refactored sub-assemblies as discussed below.

The specific potential refactoring identification parameters defined at DEFINE POTENTIAL REFACTORING IDENTIFICATION PARAMETERS OPERATION 203 will vary from user-to-user and process-to-process and can include, but is not limited to: a threshold number of instances a group of basic parts must occur together before that group of basic parts is identified as a potential refactored sub-assembly; a threshold number of basic parts that must be present in a group before that group is identified as a potential refactored sub-assembly; a threshold number of finished products, or larger sub-assemblies, that must use a given group of basic parts before the given group of basic parts is identified as a potential refactored sub-assembly; or any other refactoring identification parameter desired by: the user of process for automated bill of materials refactoring 200, herein also referred to as the "user"; a provider of a parent computing system implemented financial management system, such as a computing system implemented inventory and sales tracking system, implementing process for automated bill of materials refactoring 200; and/or a provider of process for automated bill of materials refactoring 200.

In one embodiment the specific potential refactoring identification parameters defined at DEFINE POTENTIAL REFACTORING IDENTIFICATION PARAMETERS OPERATION 203 are provided by a third party such as a user's group or community associated with: the user's business area; business in general; a parent computing system implemented financial management system, such as a computing system implemented inventory and sales tracking system, implementing process for automated bill of materials refactoring 200; and/or process for automated bill of materials refactoring 200.

In one embodiment, no special parameters are defined at DEFINE POTENTIAL REFACTORING IDENTIFICATION PARAMETERS OPERATION 203 beyond a basic search for groupings and/or potential sub-assemblies having two or more basic parts and/or sub-assemblies that occur two or more times. In one embodiment, once the parameters are established and/or defined at DEFINE POTENTIAL REFACTORING IDENTIFICATION PARAMETERS OPERATION 203, process flow proceeds to STORE POTENTIAL REFACTORING IDENTIFICATION PARAMETERS OPERATION 205.

At STORE POTENTIAL REFACTORING IDENTIFICATION PARAMETERS OPERATION 205, the data representing the parameters defined at DEFINE POTENTIAL REFACTORING IDENTIFICATION PARAMETERS OPERATION 203 is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in computer readable medium, and/or any other computer program product, as defined herein. In one embodiment, the data, in whole, or in part, is stored on a webpage or in a web-based system.

Returning to FIG. 2A, in some embodiments, the means for storing the data described above are maintained, in whole, or in part, by: the user, or a user computing system; a parts/systems supplier; the provider of a parent computing system implemented financial management system employing a process for automated bill of materials refactoring, such as processes 200 and 300; the provider of a process for automated bill of materials refactoring, such as processes 200 and 300; a third party service or institution; or any other parties.

In one embodiment, once the data representing the parameters defined at DEFINE POTENTIAL REFACTORING IDENTIFICATION PARAMETERS OPERATION 203 is saved at STORE POTENTIAL REFACTORING IDENTIFICATION PARAMETERS OPERATION 205, process flow proceeds to OBTAIN HISTORICAL SUB-ASSEMBLY DATA OPERATION 207.

In one embodiment, at OBTAIN HISTORICAL SUB-ASSEMBLY DATA OPERATION 207, data representing the historical sub-assembling and/or kitting and/or grouping of basic parts and sub-assemblies including, but not limited to, electronic versions of: historical bills of materials; inventory listings; sales documents, such as purchase and delivery orders; packing slips; etc. is gathered from various databases containing the information by any one of several methods known to those of skill in the art, at the time of filing, or as developed later.

In one embodiment, process for automated bill of materials refactoring 200 makes use of the fact that most business and service providers currently use computing system implemented financial management systems and/or computing system implemented inventory and sales tracking systems.

Various computing system implemented financial management systems are available including: computing system implemented business financial management systems; computing system implemented inventory and sales tracking systems; computing system implemented tax preparation systems; and computing system implemented business accounting systems as well as various other electronic transaction data driven financial management systems. One or more of these computing system implemented financial management systems would often already be implemented by a user of process for automated bill of materials refactoring 200 and, in some embodiments, process for automated bill of materials refactoring 200 is a component, function, or module, of a parent computing system implemented financial management system.

Several computing system implemented business financial management systems provide a centralized interface with banks, and other various financial institutions, for electronically tracking financial transactions to allow a user to, for example, balance checkbooks, pay bills, track expenditures, and create and manage sales, payroll, and operating budgets. Some computer implemented business financial management systems allow a user to track the nature of financial transactions, whether the transaction involved using checks, cash, credit cards, or electronic payment, and categorize each transaction as a particular type of income or expense.

Computing system implemented inventory and sales tracking systems help users: manage and track inventory; track sales and purchases; manage expenses; and manage operating costs and often include bill of materials entry interfaces. Often the computing system implemented inventory and sales tracking system is a component or function of a computing system implemented business financial management system.

Computing system implemented business accounting systems help users perform various accounting tasks by providing an accounting system framework and providing various user interfaces that, when provided with various inventory and transaction data, organize and categorize the inventory and transaction data. Computing system implemented business accounting systems are also often a component or function of a computing system implemented business financial management system.

In one embodiment, a user implementing any of the computing system implemented financial management systems listed herein, will often already have obtained/entered data representing identification of basic parts and data representing the historical sub-assembling and/or kitting and/or grouping of basic parts and sub-assemblies, as well as historical bills of materials and other key data and documents. Consequently, in one embodiment, data regarding identification of basic parts and data representing the historical sub-assembling and/or kitting and/or grouping of basic parts and sub-assemblies is obtained at OBTAIN HISTORICAL SUB-ASSEMBLY DATA OPERATION 207 by interfacing with, and gathering the data from, any of the computing system implemented financial management systems discussed herein or as known to those of skill in the art, whether available at the time of filing or as developed later.

In one embodiment, initial data regarding the identification of basic parts and data representing the historical sub-assembling and/or kitting and/or grouping of basic parts and sub-assemblies is obtained at OBTAIN HISTORICAL SUB-ASSEMBLY DATA OPERATION 207 through electronic invoice and/or transaction records generated at the time of purchase or sale of an inventory item or finished product and typically kept by the user either using a computing system implemented financial management system or by saving the electronic invoice and/or transaction record by one or more of the various mechanisms for storing data known to those of skill in the art, and/or as discussed below, and/or as developed later.

In one embodiment, initial data regarding the identification of basic parts and data representing the historical sub-assembling and/or kitting and/or grouping of basic parts and sub-assemblies, is obtained at OBTAIN HISTORICAL SUB-ASSEMBLY DATA OPERATION 207 through barcodes or RFID on the finished product itself by scanning or receiving the information directly from the finished product or its packaging.

In one embodiment, initial data regarding the identification of basic parts and data representing the historical sub-assembling and/or kitting and/or grouping of basic parts and sub-assemblies, is obtained at OBTAIN HISTORICAL SUB-ASSEMBLY DATA OPERATION 207 by user entry initially and then process for automated bill of materials refactoring 200 is used on the manual data for all further refactoring.

In other embodiments, data regarding the identification of basic parts and data representing the historical sub-assembling and/or kitting and/or grouping of basic parts and sub-assemblies is obtained at OBTAIN HISTORICAL SUB-ASSEMBLY DATA OPERATION 207 by any means, whether known or available at the time of filing or as later developed, for gathering data representing the historical sub-assembling and/or kitting and/or grouping of basic parts and sub-assemblies from a computing system, computing device, database, server system, web page, or any other data storage and/or data display and/or data manipulation means or mechanism, whether known or available at the time of filing or as later developed.

In one embodiment, once data representing historical bills of materials and/or the historical sub-assembling and/or kitting and/or grouping of basic parts and sub-assemblies is obtained at OBTAIN HISTORICAL SUB-ASSEMBLY DATA OPERATION 207, process flow proceeds to SCAN HISTORICAL SUB-ASSEMBLY DATA AND IDENTIFY POTENTIAL REFACTORED SUB-ASSEMBLIES OPERATION 209.

In one embodiment, at SCAN HISTORICAL SUB-ASSEMBLY DATA AND IDENTIFY POTENTIAL REFACTORED SUB-ASSEMBLIES OPERATION 209 the data obtained at OBTAIN HISTORICAL SUB-ASSEMBLY DATA OPERATION 207 is scanned/searched by one of numerous methods and/or processes and/or apparatuses known to those of skill the art for searching data, a database, or data file, in an effort to identify potential sub-assemblies based on the parameters provided at DEFINE POTENTIAL REFACTORING IDENTIFICATION PARAMETERS OPERATION 203.

In one embodiment, the data obtained at OBTAIN HISTORICAL SUB-ASSEMBLY DATA OPERATION 207 is scanned/searched at SCAN HISTORICAL SUB-ASSEMBLY DATA AND IDENTIFY POTENTIAL REFACTORED SUB-ASSEMBLIES OPERATION 209 to search for any two or more basic parts and/or or sub-assemblies, that are used together in at least two instances and/or for two different final products or larger assemblies. As discussed below, in one embodiment this is accomplished using a multiplexing function, implemented in either hardware, software, or a combination of hardware and software, such as is known to those of skill in the art at the time of filing or as developed thereafter. In one embodiment, when found, any such group of two of more basic parts and or sub-assemblies is identified as a potential refactored sub-assembly.

In one embodiment, the data obtained at OBTAIN HISTORICAL SUB-ASSEMBLY DATA OPERATION 207 is scanned/searched at SCAN HISTORICAL SUB-ASSEMBLY DATA AND IDENTIFY POTENTIAL REFACTORED SUB-ASSEMBLIES OPERATION 209 to search for a group of two of more basic parts and/or sub-assemblies that occur together more than a threshold number of instances in two or more final products and/or larger assemblies. When found, such a group of basic parts and/or sub-assemblies is identified as a potential refactored sub-assembly.

As another example, in one embodiment, the data obtained at OBTAIN HISTORICAL SUB-ASSEMBLY DATA OPERATION 207 is scanned/searched at SCAN HISTORICAL SUB-ASSEMBLY DATA AND IDENTIFY POTENTIAL REFACTORED SUB-ASSEMBLIES OPERATION 209 to search for a group of a threshold number of basic parts and/or sub-assemblies that are used together in at least two instances for two different final products or larger assemblies such a group of basic parts and/or sub-assemblies is identified as a potential refactored sub-assembly.

In one embodiment, the data obtained at OBTAIN HISTORICAL SUB-ASSEMBLY DATA OPERATION 207 is scanned/searched at SCAN HISTORICAL SUB-ASSEMBLY DATA AND IDENTIFY POTENTIAL REFACTORED SUB-ASSEMBLIES OPERATION 209 based on any of the parameters, or any combination of parameters, defined at DEFINE POTENTIAL REFACTORING IDENTIFICATION PARAMETERS OPERATION 203.

In one embodiment, the potential refactored sub-assembly are identified at SCAN HISTORICAL SUB-ASSEMBLY DATA AND IDENTIFY POTENTIAL REFACTORED SUB-ASSEMBLIES OPERATION 209 based on any of the parameters, or any combination of parameters, defined at DEFINE POTENTIAL REFACTORING IDENTIFICATION PARAMETERS OPERATION 203 using methods, processes and apparatuses, implemented in software and/or hardware and/or a combination of software and hardware, well known to those of skill for processing, parsing, correlating, comparing and operating on data. The chosen methods, processes and apparatuses will vary depending on the parameters defined at DEFINE POTENTIAL REFACTORING IDENTIFICATION PARAMETERS OPERATION 203. For instance in one embodiment, the potential refactored sub-assembly are identified using a multiplexing function, implemented in either hardware, software, or a combination of hardware and software, such as is known to those of skill in the art at the time of filing or as developed thereafter.

In one embodiment, once the data obtained at OBTAIN HISTORICAL SUB-ASSEMBLY DATA OPERATION 207 is scanned/searched at SCAN HISTORICAL SUB-ASSEMBLY DATA AND IDENTIFY POTENTIAL REFACTORED SUB-ASSEMBLIES OPERATION 209 a list of the potential refactored sub-assemblies found in the data obtained at OBTAIN HISTORICAL SUB-ASSEMBLY DATA OPERATION 207 that meet the parameters of DEFINE POTENTIAL REFACTORING IDENTIFICATION PARAMETERS OPERATION 203 is identified.

In one embodiment, once the list of potential refactored sub-assemblies found in the data obtained at OBTAIN HISTORICAL SUB-ASSEMBLY DATA OPERATION 207 that meet the parameters of DEFINE POTENTIAL REFACTORING IDENTIFICATION PARAMETERS OPERATION 203 is identified at SCAN HISTORICAL SUB-ASSEMBLY DATA AND IDENTIFY POTENTIAL REFACTORED SUB-ASSEMBLIES OPERATION 209 process flow proceeds to STORE POTENTIAL REFACTORED SUB-ASSEMBLIES OPERATION 211.

At STORE POTENTIAL REFACTORED SUB-ASSEMBLIES OPERATION 211 the data representing the list of potential refactored sub-assemblies found in the data obtained at OBTAIN HISTORICAL SUB-ASSEMBLY DATA OPERATION 207 that meet the parameters of DEFINE POTENTIAL REFACTORING IDENTIFICATION PARAMETERS OPERATION 203 identified at SCAN HISTORICAL SUB-ASSEMBLY DATA AND IDENTIFY POTENTIAL REFACTORED SUB-ASSEMBLIES OPERATION 209 is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in computer readable medium, and/or any other computer program product, as defined herein. In one embodiment, the data, in whole, or in part, is stored on a webpage or in a web-based system.

Returning to FIG. 2A, in some embodiments, the means for storing the data described above are maintained, in whole, or in part, by: the user, or a user computing system; a parts/systems supplier; the provider of a parent computing system implemented financial management system employing a process for automated bill of materials refactoring, such as processes 200 and 300; the provider of a process for automated bill of materials refactoring, such as processes 200 and 300; a third party service or institution; or any other parties.

In one embodiment, once the data representing the list of potential refactored sub-assemblies found in the data obtained at OBTAIN HISTORICAL SUB-ASSEMBLY DATA OPERATION 207 that meet the parameters of DEFINE POTENTIAL REFACTORING IDENTIFICATION PARAMETERS OPERATION 203 identified at SCAN HISTORICAL SUB-ASSEMBLY DATA AND IDENTIFY POTENTIAL REFACTORED SUB-ASSEMBLIES OPERATION 209 is saved at STORE POTENTIAL REFACTORED SUB-ASSEMBLIES OPERATION 211, process flow proceeds to GENERATE AND DISPLAY POTENTIAL REFACTORED SUB-ASSEMBLIES REPORT OPERATION 213.

In one embodiment, at GENERATE AND DISPLAY POTENTIAL REFACTORED SUB-ASSEMBLIES REPORT OPERATION 213 a potential refactored sub-assemblies report listing all the all potential refactored sub-assemblies found in the data obtained at OBTAIN HISTORICAL SUB-ASSEMBLY DATA OPERATION 207 that meet the parameters of DEFINE POTENTIAL REFACTORING IDENTIFICATION PARAMETERS OPERATION 203 identified at SCAN HISTORICAL SUB-ASSEMBLY DATA AND IDENTIFY POTENTIAL REFACTORED SUB-ASSEMBLIES OPERATION 209 is generated and displayed for the user or a designated third party.

In one embodiment, the potential refactored sub-assemblies report generated at GENERATE AND DISPLAY POTENTIAL REFACTORED SUB-ASSEMBLIES REPORT OPERATION 213 is accomplished via communication between one or more computing systems such as computing systems 100 and 150 of FIG. 1 using a network such as network 130 that can be any network or network system that is of interest to a user such as a Local Area Network (LAN), a Wide Area Network (WAN), a public network, such as the Internet, a private network, or other network capable of allowing communication between two or more computing systems. In one embodiment, communication is facilitated using analog modems, digital modems, network interface cards, broadband connections, or any other means for communicably coupling computing systems, whether known at the time of filing or as later developed.

Returning to FIG. 2A, in one embodiment, the potential refactored sub-assemblies report is generated at GENERATE AND DISPLAY POTENTIAL REFACTORED SUB-ASSEMBLIES REPORT OPERATION 213 and distributed via phone lines, phone signals or any other form of electronic audio/video/text or messaging and/or communication known at the time of filing or as later developed.

In one embodiment, the potential refactored sub-assemblies report generated at GENERATE AND DISPLAY POTENTIAL REFACTORED SUB-ASSEMBLIES REPORT OPERATION 213 is in the form of a display shown on a display device such as display devices 115, 165, 125 of FIG. 1. FIG. 2B shows a representation of a display screen 231 on display device 230, such as display devices 115 and 165 of FIG. 1, including an potential refactored sub-assemblies report 240 (FIG. 2B) activated at GENERATE AND DISPLAY POTENTIAL REFACTORED SUB-ASSEMBLIES REPORT OPERATION 213 (FIG. 2A) listing potential refactored sub-assemblies found in the data obtained at OBTAIN HISTORICAL SUB-ASSEMBLY DATA OPERATION 207 that meet the parameters of DEFINE POTENTIAL REFACTORING IDENTIFICATION PARAMETERS OPERATION 203 identified at SCAN HISTORICAL SUB-ASSEMBLY DATA AND IDENTIFY POTENTIAL REFACTORED SUB-ASSEMBLIES OPERATION 209

The specific illustrative example of potential refactored sub-assemblies report shown in FIG. 2B shows a potential refactored sub-assemblies report indicating that the basic parts: Microprocessor (1); Power Supply Module (1); Capacitors, 10 microfarad (5); Capacitors, 5 microfarad (6); Resistors 10 ohm (6); Resistors 3 ohm (20); discussed in the example above as being part of a "motherboard" used in a desktop system, a notebook system, and a server system, have been identified as potential refactored sub-assemblies.

As shown in FIG. 2B, in one example, potential refactored sub-assemblies report 240 includes: alert text section 241 indicating "THE FOLLOWING BASIC PARTS/SUB-ASSEMBLIES OCCUR TOGETHER THREE TIMES IN THREE DIFFERENT LARGER ASSEMBLIES/PRODUCTS:"; the basic parts listing 242; larger systems listing section 244 indicating that "THESE BASIC PARTS/SUB-ASSEMBLIES OCCUR TOGETHER IN THE FOLLOWING LARGER SYSTEMS: 1. DESKTOP. SYSTEM; 2. NOTEBOOK SYSTEM; 3. SERVER SYSTEM"; and user confirmation/edit section 246, were a user, or designated third party, can, in one embodiment, either accept the potential refactored sub-assembly, decline the potential refactored sub-assembly, or, in one embodiment, edit the potential refactored sub-assembly.

In the specific example of a potential refactored sub-assemblies report 240 of FIG. 2B, the user or designated third party is: informed of the potential refactored sub-assembly; shown the basic parts/sub-assemblies making up the potential refactored sub-assembly; informed of the larger assemblies using the potential refactored sub-assembly; and is given the opportunity to confirm, decline and/or edit the potential refactored sub-assembly. Consequently, in this embodiment, a user is provided with significant information and system control.

Those of skill in the art will recognize that the choice of information displayed, the organization of the information displayed, and the manner in which the information is displayed in FIG. 2B was made for illustrative purposes only and that other types of information, organization of that information, and manner of displaying the information, can be implemented without departing from the scope as set forth in the claims below.

In one embodiment, once a potential refactored sub-assemblies report, such as potential refactored sub-assemblies report 240 of FIG. 2B is generated at GENERATE AND DISPLAY POTENTIAL REFACTORED SUB-ASSEMBLIES REPORT OPERATION 213 of FIG. 2A, process flow proceeds to EDIT/CONFIRM POTENTIAL REFACTORED SUB-ASSEMBLIES OPERATION 215.

At EDIT/CONFIRM POTENTIAL REFACTORED SUB-ASSEMBLIES OPERATION 215 a user of process for automated bill of materials refactoring 200 is given the opportunity to edit and/or confirm the potential refactored sub-assemblies listed in the potential refactored sub-assemblies report, such as potential refactored sub-assemblies report 240 of FIG. 2B.

Referring back to FIG. 2B, in one illustrative example user confirmation/edit section 246 of potential refactored sub-assemblies report 240 provides a user or designated third party, the opportunity to, in one embodiment, either accept the potential refactored sub-assembly by activating YES block 247, decline the potential refactored sub-assembly by activating NO block 248, or, in one embodiment edit the potential refactored sub-assembly by activating EDIT block 246.

In one embodiment, declining the potential refactored sub-assembly by activating NO block 248 causes the proposed potential refactored sub-assembly to be dropped and erased. In one embodiment, activating EDIT block 246 allows the user to edit the basic parts listing 242 or list of larger components in larger systems listing section 244, to add or delete elements and/or customize the refactored sub-assembly. In one embodiment, activating YES block 247 causes a second screen display to be generated.

Figure 2C:
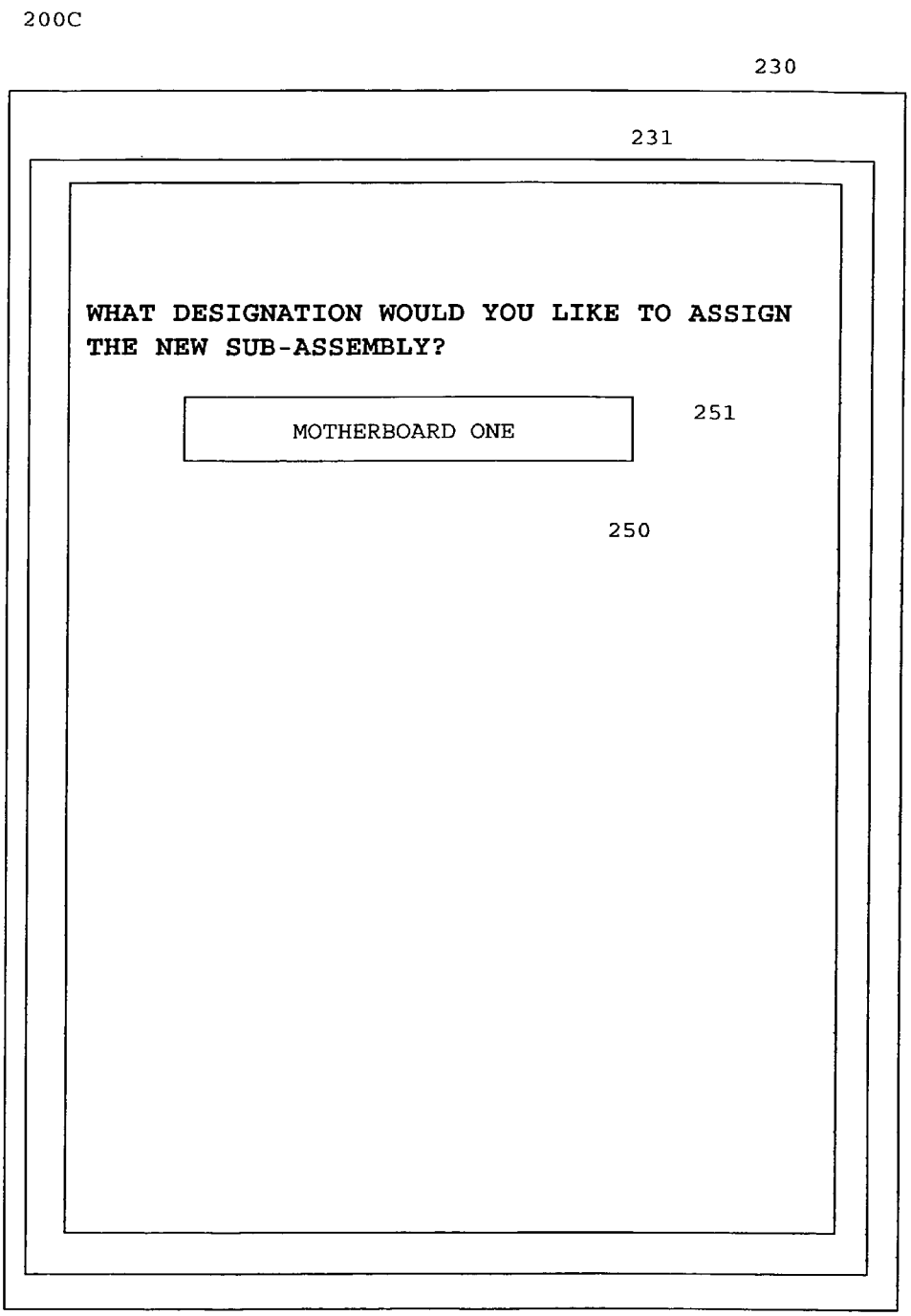
FIG. 2C is a representation of one embodiment of a display screen layout in accordance with one embodiment of a process for automated bill of materials refactoring.

FIG. 2C shows one embodiment of a screen display layout 200C, including-sub-assembly designation screen 250 as would be displayed a display screen 231 on display device 230, such as display devices 115 and 165 of FIG. 1, once YES block 247 is activated.

As can be seen in FIG. 2C, display screen layout 200C includes sub-assembly designation screen 250 wherein a user is asked what designation he or she would like to apply to the potential refactored sub-assembly of potential refactored sub-assemblies report 240 of FIG. 2B. In the particular illustrative example of FIG. 2C, the user has chosen the designation "MOTHERBOARD ONE" and entered that name into name window 251 of FIG. 2C. In the one illustrative example shown in FIG. 2B, FIG. 2C and FIG. 2D, once the designation for the potential refactored sub-assembly of potential refactored sub-assemblies report 240 of FIG. 2B is entered, display screen layout 200D is generated as shown in FIG. 2D.

As seen in FIG. 2D, display screen layout 200D includes confirmation screen 260. In this particular illustrative example, confirmation screen 260 includes text 262 summarizing, once again, the basic parts making up refactored sub-assembly of potential refactored sub-assemblies report 240 of FIG. 2B designated "MOTHERBOARD ONE" and the larger products and or assemblies incorporating "MOTHERBOARD ONE". Returning to FIG. 2D, confirmation screen 260 also, in this one illustrative example, includes "CONFIRMED" checkbox 263 whereby a user and/or designated third party can finally confirm the refactored sub-assembly of potential refactored sub-assemblies report 240 of FIG. 2B after reviewing the summary text of confirmation screen 260.

Those of skill in the art will recognize that the choice of information displayed, the organization of the information displayed, and the manner in which the information is displayed in FIG. 2C, and FIG. 2D, like FIG. 2B discussed above, was made for illustrative purposes only and that other types of information, organization of that information, and manner of displaying the information, can be implemented without departing from the scope as set forth in the claims below. In addition, those of skill in the art will readily recognize that various means for interfacing with, activating, or editing, the information displayed on display screen layouts 200B, 200C, and 200D or FIGS. 2B, 2C, and 2D are possible, and that the specific means discussed above do not limit the scope as set forth in the claims below.

In one embodiment, once the user of process for automated bill of materials refactoring 200 is given the opportunity to edit and/or confirm the potential refactored sub-assemblies listed in the potential refactored sub-assemblies report, such as potential refactored sub-assemblies report 240 of FIG. 2B, at EDIT/CONFIRM POTENTIAL REFACTORED SUB-ASSEMBLIES OPERATION 215 of FIG. 2A, process flow proceeds to SAVE EDITED/CONFIRMED REFACTORED SUB-ASSEMBLIES OPERATION 217.

In one embodiment, at SAVE EDITED/CONFIRMED REFACTORED SUB-ASSEMBLIES OPERATION 217, the data representing the edited and confirmed refactored sub-assemblies listed in the potential refactored sub-assemblies report is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in computer readable medium, and/or any other computer program product, as defined herein. In one embodiment, the data, in whole, or in part, is stored on a webpage or in a web-based system.

Returning to FIG. 2A, in some embodiments, the means for storing the data described above are maintained, in whole, or in part, by: the user, or a user computing system; a parts/systems supplier; the provider of a parent computing system implemented financial management system employing a process for automated bill of materials refactoring, such as processes 200 and 300; the provider of a process for automated bill of materials refactoring, such as processes 200 and 300; a third party service or institution; or any other parties.

In one embodiment, once the data representing the edited and confirmed refactored sub-assemblies listed in the potential refactored sub-assemblies report is saved at SAVE EDITED/CONFIRMED REFACTORED SUB-ASSEMBLIES OPERATION 217, process flow proceeds to IMPLEMENT REFACTORED SUB-ASSEMBLIES OPERATION 219.

In one embodiment, at IMPLEMENT REFACTORED SUB-ASSEMBLIES OPERATION 219, the edited and/or confirmed refactored sub-assemblies listed in the potential refactored sub-assemblies report of GENERATE AND DISPLAY POTENTIAL REFACTORED SUB-ASSEMBLIES REPORT OPERATION 213 is implemented as a standard sub-assembly within all subsequent bills of materials generated and or used by the user, the user's business, a computing system implemented financial management system employing process for automated bill of materials refactoring 200, and/or process for automated bill of materials refactoring 200.

In one embodiment, once the edited and/or confirmed refactored sub-assemblies listed in the potential refactored sub-assemblies report of GENERATE AND DISPLAY POTENTIAL REFACTORED SUB-ASSEMBLIES REPORT OPERATION 213 is implemented as a standard sub-assembly within all subsequent bills of materials at IMPLEMENT REFACTORED SUB-ASSEMBLIES OPERATION 219, process flow proceeds to END OPERATION 221 and process for automated bill of materials refactoring 200 returns to DEFINE POTENTIAL REFACTORING IDENTIFICATION PARAMETERS OPERATION 203 to await changes in the operating parameters and a new search or OBTAIN HISTORICAL SUB-ASSEMBLY DATA OPERATION 207 for the next update. In some embodiments, process for automated bill of materials refactoring 200 is run automatically on a pre-defined periodic basis.

As a specific illustrative example of the operation of process for automated bill of materials refactoring 200, we will continue with the example discussed above with respect to the computing system manufacturer that produces/assembles a desktop system, a notebook system, and a server system that share the same motherboard. Recall that it was stipulated that the common motherboard includes: Microprocessor (1); Power Supply Module (1); Capacitors, 10 microfarad (5); Capacitors, 5 microfarad (6); Resistors 10 ohm (6); Resistors 3 ohm (20).

For this example, we will further stipulate that the user, i.e., the computing system manufacturer, establishes at DEFINE POTENTIAL REFACTORING IDENTIFICATION PARAMETERS OPERATION 203 that the threshold number of instances a group of basic parts and/or sub-assemblies must occur together before that group of basic parts and/or sub-assemblies is identified as a potential refactored sub-assembly is three times and that a threshold number of basic parts and/or sub-assemblies that must be present in a group before that group is identified as a potential refactored sub-assembly is four. Data representing these parameters is then saved at STORE POTENTIAL REFACTORING IDENTIFICATION PARAMETERS OPERATION 205.

For this specific illustrative example, we will further stipulate that the manufacturer uses a computing system implemented financial management system including a computing system implemented inventory and sales tracking system. We will further stipulate, that the computing system implemented inventory and sales tracking system includes historical bills of materials associated with the products manufactured. Consequently, at OBTAIN HISTORICAL SUB-ASSEMBLY DATA OPERATION 207 the historical bills of materials data is gathered.

At SCAN HISTORICAL SUB-ASSEMBLY DATA AND IDENTIFY POTENTIAL REFACTORED SUB-ASSEMBLIES OPERATION 209 the historical bills of materials are then scanned/searched to identify potential refactored sub-assemblies that occur in three separate larger assemblies or finished products and include four or more basic parts and/or subassemblies in accordance with the parameters established by the manufacturer/user at DEFINE POTENTIAL REFACTORING IDENTIFICATION PARAMETERS OPERATION 203.

At SCAN HISTORICAL SUB-ASSEMBLY DATA AND IDENTIFY POTENTIAL REFACTORED SUB-ASSEMBLIES OPERATION 209, process for automated bill of materials refactoring 200 discovers the group consisting of Microprocessor (1); Power Supply Module (1); Capacitors, 10 microfarad (5); Capacitors, 5 microfarad (6); Resistors 10 ohm (6); Resistors 3 ohm (20) that, unnoticed by the manufacturer until now, are all associated with the common motherboard. Since, these basic parts occur in three separate larger systems and include 39 individual basic parts, this group is identified as a potential refactored sub-assembly at SCAN HISTORICAL SUB-ASSEMBLY DATA AND IDENTIFY POTENTIAL REFACTORED SUB-ASSEMBLIES OPERATION 209 and the associated data is stored at STORE POTENTIAL REFACTORED SUB-ASSEMBLIES OPERATION 211.

In one embodiment, at GENERATE AND DISPLAY POTENTIAL REFACTORED SUB-ASSEMBLIES REPORT OPERATION 213, a screen display, such as screen display 200B, is generated including a potential refactored sub-assemblies report such as potential refactored sub-assemblies report 240 of FIG. 2B.

In this illustrative example, we assume the manufacturer/user chooses YES block 247 and a display screen such as display screen 200C of FIG. 2C is generated including naming window 251. We further assume the manufacturer designates the sub-assembly "MOTHERBOARD ONE" and a display screen such as display screen 200D including confirmation screen 260 and summary text 262 is displayed. We again assume the manufacturer confirms the refactored sub-assembly at "CONFIRMED" checkbox 263.

In this specific illustrative example, the sub-assembly "MOTHERBOARD ONE" is then used to designate the group of basic parts including Microprocessor (1); Power Supply Module (1); Capacitors, 10 microfarad (5); Capacitors, 5 microfarad (6); Resistors 10 ohm (6); Resistors 3 ohm (20) on all future bills of materials and inventory/product listings and/or entries.

Using the process for automated bill of materials refactoring 200, computer processing power is used in conjunction with often pre-existing databases and historical bills of materials to identify potential refactoring of basic parts into sub-assemblies that would often escape human detection. In addition, the refactoring is accomplished at computing system speeds far exceeding human capabilities. Consequently, using process for automated bill of materials refactoring 200 more efficient and useful bills of material can be created, more accurately and faster, and significant redundancy of user input and/or automated processing can be avoided.

Some users may desire to bypass the confirmation/editing process to more fully automate the process for automated bill of materials refactoring. FIG. 3 is a flow chart depicting a process for automated bill of materials refactoring 300 in accordance with one embodiment. Process for automated bill of materials refactoring 300 begins at ENTER OPERATION 301 and process flow proceeds to DEFINE POTENTIAL REFACTORING IDENTIFICATION PARAMETERS OPERATION 303.

DEFINE POTENTIAL REFACTORING IDENTIFICATION PARAMETERS OPERATION 303; STORE POTENTIAL REFACTORING IDENTIFICATION PARAMETERS OPERATION 305; OBTAIN HISTORICAL SUB-ASSEMBLY DATA OPERATION 307; SCAN HISTORICAL SUB-ASSEMBLY DATA AND IDENTIFY POTENTIAL REFACTORED SUB-ASSEMBLIES OPERATION 309; STORE POTENTIAL REFACTORED SUB-ASSEMBLIES OPERATION 311; and GENERATE AND DISPLAY POTENTIAL REFACTORED SUB-ASSEMBLIES REPORT OPERATION 313, of process for automated bill of materials refactoring 300 of FIG. 3 are substantially identical to: DEFINE POTENTIAL REFACTORING IDENTIFICATION PARAMETERS OPERATION 203; STORE POTENTIAL REFACTORING IDENTIFICATION PARAMETERS OPERATION 205; OBTAIN HISTORICAL SUB-ASSEMBLY DATA OPERATION 207; SCAN HISTORICAL SUB-ASSEMBLY DATA AND IDENTIFY POTENTIAL REFACTORED SUB-ASSEMBLIES OPERATION 209; STORE POTENTIAL REFACTORED SUB-ASSEMBLIES OPERATION 211; and GENERATE AND DISPLAY POTENTIAL REFACTORED SUB-ASSEMBLIES REPORT OPERATION 213 of process for automated bill of materials refactoring 200 of FIG. 2A. Consequently, the discussion above of DEFINE POTENTIAL REFACTORING IDENTIFICATION PARAMETERS OPERATION 203; STORE POTENTIAL REFACTORING IDENTIFICATION PARAMETERS OPERATION 205; OBTAIN HISTORICAL SUB-ASSEMBLY DATA OPERATION 207; SCAN HISTORICAL SUB-ASSEMBLY DATA AND IDENTIFY POTENTIAL REFACTORED SUB-ASSEMBLIES OPERATION 209; STORE POTENTIAL REFACTORED SUB-ASSEMBLIES OPERATION 211; and GENERATE AND DISPLAY POTENTIAL REFACTORED SUB-ASSEMBLIES REPORT OPERATION 213 of process for automated bill of materials refactoring 200 of FIG. 2A is applicable to, and incorporated here for, similarly named and labeled elements of DEFINE POTENTIAL REFACTORING IDENTIFICATION PARAMETERS OPERATION 303; STORE POTENTIAL REFACTORING IDENTIFICATION PARAMETERS OPERATION 305; OBTAIN HISTORICAL SUB-ASSEMBLY DATA OPERATION 307; SCAN HISTORICAL SUB-ASSEMBLY DATA AND IDENTIFY POTENTIAL REFACTORED SUB-ASSEMBLIES OPERATION 309; STORE POTENTIAL REFACTORED SUB-ASSEMBLIES OPERATION 311; and GENERATE AND DISPLAY POTENTIAL REFACTORED SUB-ASSEMBLIES REPORT OPERATION 313, of process for automated bill of materials refactoring 300 of FIG. 3.

Returning to FIG. 3, in one embodiment, once a potential refactored sub-assemblies report, such as potential refactored sub-a'ssemblies report 240 of FIG. 2B is generated at GENERATE AND DISPLAY POTENTIAL REFACTORED SUB-ASSEMBLIES REPORT OPERATION 313 of FIG. 3, process flow proceeds directly to SAVE REFACTORED SUB-ASSEMBLIES OPERATION 316.

In one embodiment, at SAVE REFACTORED SUB-ASSEMBLIES OPERATION 316, the data representing the refactored sub-assemblies of potential refactored sub-assemblies report 240 is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in computer readable medium, and/or any other computer program product, as defined herein. In one embodiment, the data, in whole, or in part, is stored on a webpage or in a web-based system.

Returning to FIG. 3, in some embodiments, the means for storing the data described above are maintained, in whole, or in part, by: the user, or a user computing system; a parts/systems supplier; the provider of a parent computing system implemented financial management system employing a process for automated bill of materials refactoring, such as processes 200 and 300; the provider of a process for automated bill of materials refactoring, such as processes 200 and 300; a third party service or institution; or any other parties.

In one embodiment, once the data representing the refactored sub-assemblies of potential refactored sub-assemblies report 240 is saved at SAVE REFACTORED SUB-ASSEMBLIES OPERATION 316, process flow proceeds to AUTOMATICALLY IMPLEMENT REFACTORED SUB ASSEMBLIES/KITS OPERATION 318.

In one embodiment, at AUTOMATICALLY IMPLEMENT REFACTORED SUB ASSEMBLIES/KITS OPERATION 318 the refactored sub-assemblies listed in the potential refactored sub-assemblies report of GENERATE AND DISPLAY POTENTIAL REFACTORED SUB-ASSEMBLIES REPORT OPERATION 313 are implemented as standard sub-assemblies within all subsequent bills of materials generated and or used by the user, the user's business, a computing system implemented financial management system employing process for automated bill of materials refactoring 300, and/or process for automated bill of materials refactoring 300.

In one embodiment, once the sub-assemblies listed in the potential refactored sub-assemblies report of GENERATE AND DISPLAY POTENTIAL REFACTORED SUB-ASSEMBLIES REPORT OPERATION 313 are implemented as standard sub-assemblies within all subsequent bills of materials at AUTOMATICALLY IMPLEMENT REFACTORED SUB-ASSEMBLIES OPERATION 318, process flow proceeds to END OPERATION 321 and process for automated bill of materials refactoring 300 returns to DEFINE POTENTIAL REFACTORING IDENTIFICATION PARAMETERS OPERATION 303 to await changes in it operating parameters and a new search or OBTAIN HISTORICAL SUB-ASSEMBLY DATA OPERATION 307 for the next update. In some embodiments, process for automated bill of materials refactoring 300 is run automatically on a pre-defined periodic basis In some embodiments, some of, or all of, the data associated with, created by, processed by, used by, or modified by, process for automated bill of materials refactoring 200 and process for automated bill of materials refactoring 300 and/or display screen layouts 300B, 300C and 300D, is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in computer readable medium, and/or any other computer program product, as defined herein. In one embodiment, the data, in whole, or in part, is stored on a webpage or in a web-based system.

In some embodiments, the means for storing the data described above are maintained, in whole, or in part, by: the user, or a user computing system; a financial institution; the provider of a parent computing system implemented financial management system employing a process for automated bill of materials refactoring, such as processes 200 and 300; the provider of a process for automated bill of materials refactoring, such as processes 200 and 300; a third party service or institution; or any other parties.

Using the method and apparatus for automated bill of materials refactoring, and a process for automated bill of materials refactoring, disclosed herein, such as processes for automated bill of materials refactoring 200 and 300 discussed above, computer processing is used in conjunction with often pre-existing databases to identify potential refactoring of basic parts into sub-assemblies that would often escape human detection. In addition, the refactoring is accomplished at computing system speeds far exceeding human capabilities. Consequently, using the method and apparatus for automated bill of materials refactoring, and a process for automated bill of materials refactoring, disclosed herein, more efficient and useful bills of material can be created, more accurately and faster, and significant redundancy of user input and/or automated processing can be avoided as well as opportunities for error introduction.

In addition, as discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components and/or operations described herein is merely exemplary, and not mandatory or significant. Consequently, functions performed by a single component and/or operation may, in other embodiments, be performed by multiple components and/or operations, and functions performed by multiple components and/or operations may, in other embodiments, be performed by a single component and/or operation.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "storing", "displaying", "defining", "scanning", "generating", "implementing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for automated bill of materials refactoring, discussed herein, are identified using a particular nomenclature for ease of description and understanding, but other nomenclature is often used in the art to identify equivalent operations.

In addition, the order of operations depicted in the FIG.s and discussed above was chose for merely illustrative purposes. Those of skill in the art will readily recognize that different orders of operations can be implemented without departing from the scope of the invention as claimed below.

Therefore, numerous variations, whether explicitly provided for by the specification or implied by the specification or not, may be implemented by one of skill in the art in view of this disclosure.

What is claimed is:

1. A computer-implemented method for automated bill of materials refactoring comprising:
    defining, by a computer, potential bill of materials refactoring parameters;
    obtaining, by the computer, historical bill of materials sub-assembly data;
    scanning, by the computer, the historical bill of materials sub-assembly data and identifying potential bill of materials refactored sub-assemblies using the potential bill of materials refactoring parameters; and providing, by the computer, a listing of potential bill of materials refactored sub-assemblies to a user of the process for automated bill of materials refactoring.

2. The computing system implemented process for automated bill of materials refactoring of claim 1, wherein:
the historical bill of materials sub-assembly data is obtained from a computing system implemented financial management system.

3. The computing system implemented process for automated bill of materials refactoring of claim 1, wherein:
the historical bill of materials sub-assembly data comprises historically used bills of materials.

4. The computing system implemented process for automated bill of materials refactoring of claim 1, wherein:
the defined potential bill of materials refactoring parameters include defining a threshold number of finished products, or larger sub-assemblies, that must use a group of basic parts before the group of basic parts is identified as a potential bill of materials refactored sub-assembly.

5. The computing system implemented process for automated bill of materials refactoring of claim 1, wherein:
the defined potential bill of materials refactoring parameters include defining a threshold number of basic parts that must be present in a group of basic parts before the group of basic parts is identified as a potential bill of materials refactored sub-assembly.

6. The computing system implemented process for automated bill of materials refactoring of claim 1, wherein:
the defined potential bill of materials refactoring parameters include defining any group of two or more basic parts used together in two of more finished products, or larger sub-assemblies, as a potential bill of materials refactored sub-assembly.

7. The computing system implemented process for automated bill of materials refactoring of claim 1, further comprising:
providing the user of the process for automated bill of materials refactoring the ability to edit the listing of potential bill of materials refactored sub-assemblies.

8. The computing system implemented process for automated bill of materials refactoring of claim 7, further comprising:
providing the user of the process for automated bill of materials refactoring the ability to confirm each potential bill of materials refactored sub-assembly listed in the listing of potential bill of materials refactored sub-assemblies.

9. The computing system implemented process for automated bill of materials refactoring of claim 8, further comprising:
upon confirmation from the user of the process for automated bill of materials refactoring of a bill of materials refactored sub-assembly in the listing of potential bill of materials refactored sub-assemblies, automatically implementing the confirmed bill of materials refactored sub-assembly in all subsequent bills of materials.

10. The computing system implemented process for automated bill of materials refactoring of claim 1, further comprising:
upon providing a listing of potential bill of materials refactored sub-assemblies to a user of the process for automated bill of materials refactoring, automatically implementing the potential bill of materials refactored sub-assemblies listed in the listing of potential bill of materials refactored sub-assemblies in all subsequent bills of materials.

11. A system for automated bill of materials refactoring comprising:
a computing system;
a display device; and
a processor for executing a process for automated bill of materials refactoring, the process for automated bill of materials refactoring comprising:
defining potential bill of materials refactoring parameters;
obtaining historical bill of materials sub-assembly data;
scanning the historical bill of materials sub-assembly data and identifying potential bill of materials refactored sub-assemblies using the potential bill of materials refactoring parameters; and
displaying a listing of potential bill of materials refactored sub-assemblies to a user of the process for automated bill of materials refactoring on the display device.

12. The system for automated bill of materials refactoring of claim 11, wherein:
the historical bill of materials sub-assembly data is obtained from a computing system implemented financial management system.

13. The system for automated bill of materials refactoring of claim 11, wherein:
the historical bill of materials sub-assembly data comprises historically used bills of materials.

14. The system for automated bill of materials refactoring of claim 11, wherein:
the defined potential bill of materials refactoring parameters include defining a threshold number of finished products, or larger sub-assemblies, that must use a group of basic parts before the group of basic parts is identified as a potential bill of materials refactored sub-assembly.

15. The system for automated bill of materials refactoring of claim 11, wherein:
the defined potential bill of materials refactoring parameters include defining a threshold number of basic parts that must be present in a group of basic parts before the group of basic parts is identified as a potential bill of materials refactored sub-assembly.

16. The system for automated bill of materials refactoring of claim 11, wherein:
the defined potential bill of materials refactoring parameters include defining any group of two or more basic parts used together in two of more finished products, or larger sub-assemblies, as a potential bill of materials refactored sub-assembly.

17. The system for automated bill of materials refactoring of claim 11, wherein:
the process for automated bill of materials refactoring further comprises:
providing the user of the process for automated bill of materials refactoring the ability to edit the listing of potential bill of materials refactored sub-assemblies.

18. The system for automated bill of materials refactoring of claim 17, wherein:
the process for automated bill of materials refactoring further comprises:
providing the user of the process for automated bill of materials refactoring the ability to confirm each potential bill of materials refactored sub-assembly listed in the listing of potential bill of materials refactored sub-assemblies.

19. The system for automated bill of materials refactoring of claim 18, wherein:
the process for automated bill of materials refactoring further comprises:
upon confirmation from the user of the process for automated bill of materials refactoring of a bill of materials refactored sub-assembly in the listing of potential bill of materials refactored sub-assemblies, automatically implementing the confirmed bill of materials refactored sub-assembly in all subsequent bills of materials.

20. The system for automated bill of materials refactoring of claim 11, wherein:
the process for automated bill of materials refactoring further comprises:
upon providing a listing of potential bill of materials refactored sub-assemblies to a user of the process for automated bill of materials refactoring, automatically implementing the potential bill of materials refactored sub-assemblies listed in the listing of potential bill of materials refactored sub-assemblies in all subsequent bills of materials.

21. A computer program product for automated bill of materials refactoring comprising:
a computer readable medium;
and computer program code, encoded on the computer readable medium, comprising computer readable instructions for:
defining potential bill of materials refactoring parameters;
obtaining historical bill of materials sub-assembly data;
scanning the historical bill of materials sub-assembly data and identifying potential bill of materials refactored sub-assemblies using the potential bill of materials refactoring parameters; and
providing a listing of potential bill of materials refactored sub-assemblies to a user of the process for automated bill of materials refactoring.

22. The computer program product for automated bill of materials refactoring of claim 21, wherein:
the historical bill of materials sub-assembly data is obtained from a computing system implemented financial management system.

23. The computer program product for automated bill of materials refactoring of claim 21, wherein:
the historical bill of materials sub-assembly data comprises historically used bills of materials.

24. The computer program product for automated bill of materials refactoring of claim 21, wherein:
the defined potential bill of materials refactoring parameters include defining a threshold number of finished products, or larger sub-assemblies, that must use a group of basic parts before the group of basic parts is identified as a potential bill of materials refactored sub-assembly.

25. The computer program product for automated bill of materials refactoring of claim 21, wherein:
the defined potential bill of materials refactoring parameters include defining a threshold number of basic parts that must be present in a group of basic parts before the group of basic parts is identified as a potential bill of materials refactored sub-assembly.

26. The computer program product for automated bill of materials refactoring of claim 21, wherein:
the defined potential bill of materials refactoring parameters include defining any group of two or more basic parts used together in two of more finished products, or larger sub-assemblies, as a potential bill of materials refactored sub-assembly.

27. The computer program product for automated bill of materials refactoring of claim 26, wherein:
the computer program code, encoded on the computer readable medium, further comprises computer readable instructions for:
providing the user of the process for automated bill of materials refactoring the ability to edit the listing of potential bill of materials refactored sub-assemblies.

28. The computer program product for automated bill of materials refactoring of claim 27, wherein:
the computer program code, encoded on the computer readable medium, further comprises computer readable instructions for:
providing the user of the process for automated bill of materials refactoring the ability to confirm each potential bill of materials refactored sub-assembly listed in the listing of potential bill of materials refactored sub-assemblies.

29. The computer program product for automated bill of materials refactoring of claim 28, wherein:
the computer program code, encoded on the computer readable medium, further comprises computer readable instructions for:
upon confirmation from the user of the process for automated bill of materials refactoring of a bill of materials refactored sub-assembly in the listing of potential bill of materials refactored sub-assemblies, automatically implementing the confirmed bill of materials refactored sub-assembly in all subsequent bills of materials.

30. The computer program product for automated bill of materials refactoring of claim 21, wherein:
the computer program code, encoded on the computer readable medium, further comprises computer readable instructions for:
upon providing a listing of potential bill of materials refactored sub-assemblies to a user of the process for automated bill of materials refactoring, automatically implementing the potential bill of materials refactored sub-assemblies listed in the listing of potential bill of materials refactored sub-assemblies in all subsequent bills of materials.

* * * * *

UNITED STATES PATENT AND TRADEMARK OFFICE
CERTIFICATE OF CORRECTION

| | | |
|---|---|---|
| PATENT NO. | : 8,024,237 B1 | Page 1 of 1 |
| APPLICATION NO. | : 11/493209 | |
| DATED | : September 20, 2011 | |
| INVENTOR(S) | : Harold R. Davidson et al. | |

It is certified that error appears in the above-identified patent and that said Letters Patent is hereby corrected as shown below:

In the Claims

In Column 25, Line 31, Claim 6, replace "two of more" with --two or more--; and
In Column 28, Line 12, Claim 26, replace "two of more" with --two or more--.

Signed and Sealed this
Fifth Day of November, 2013

Teresa Stanek Rea
*Deputy Director of the United States Patent and Trademark Office*